United States Patent
Hagnell et al.

(10) Patent No.: US 6,212,180 B1
(45) Date of Patent: Apr. 3, 2001

(54) RECONFIGURING A MULTIPLEXER

(75) Inventors: Susanne L. Hagnell, Bromma; Anders Bjenne, Huddinge, both of (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/296,675

(22) Filed: Apr. 22, 1999

Related U.S. Application Data

(63) Continuation of application No. PCT/SE97/01785, filed on Oct. 24, 1997.

Foreign Application Priority Data

Oct. 25, 1996 (SE) .................................................. 9603908

(51) Int. Cl.$^7$ ............................. H04L 12/50; H04Q 11/00
(52) U.S. Cl. ......................... 370/371; 370/386; 370/503; 370/535
(58) Field of Search .................................. 370/535, 503, 370/371, 386, 357, 360, 367, 370

(56) References Cited

U.S. PATENT DOCUMENTS

| | | | |
|---|---|---|---|
| 3,775,754 | 11/1973 | Auspurg et al. | 330/149 |
| 5,267,069 | * 11/1993 | Griffin et al. | 359/135 |
| 5,327,422 | * 7/1994 | Abefelt et al. | 370/503 |
| 5,379,299 | 1/1995 | Schwartz | 370/519 |
| 5,696,761 | * 12/1997 | Kos et al. | 370/386 |
| 5,768,265 | * 6/1998 | Toyohara | 370/282 |
| 5,926,303 | * 7/1999 | Giebel et al. | 370/535 |

\* cited by examiner

*Primary Examiner*—Seema S. Rao
(74) *Attorney, Agent, or Firm*—Nixon & Vanderhye P.C.

(57) ABSTRACT

In an STM-network having multiplexer units (1) and a switch (3), for changes in the traffic configuration memories (41,49;43,51) must also be changed, these configuration memories being located in the multiplexer units for controlling reading and writing in intermediate FIFO-type memories (21,23). Unsynchronized writing in the configuration memories (41,49;43,51) is avoided by transmitting suitable signals between the configuration memories, in the suitable case on particular lines (53) provided therefor or otherwise by transmitting particular control messages (rec.) which are located in a time slot having a predetermined position in each transmitted frame.

3 Claims, 2 Drawing Sheets

RECONFIGURING A MULTIPLEXER

This is a continuation of PCT application Ser. No. PCT/SE97/01785, filed Oct. 24, 1997.

The present invention relates to a network for communicating information and also to multiplexers used in such a network.

BACKGROUND

In the Swedish patent 9103715-0, the corresponding International patent application PCT/SE92/00808 and U.S. Pat. No. 5,327,422 a multiplexer/demultiplexer is disclosed which is intended to be used in an STM-network ("Synchronous Transfer Mode") and which has memories of FIFO-type for smoothing or evening the input and output flow of data units in the multiplexer/demultiplexer. Such multiplexers/demultiplexers can use distributed configuration memories, which for a demultiplexer control the location to which the contents in different time slots are to be transmitted or for a multiplexer control the time slots to which different data stored in these FIFO-memories are to be forwarded. Several multiplexers/demultiplexers can be connected in a cascaded configuration and then problems can arise when changes of the configuration memories are to be made, e.g. involving that the data flow from a specific subscriber is to be increased or decreased. Messages concerning such changes are normally transmitted also in the same network and it cannot be guaranteed that such change messages arrive at the same time or at suitably chosen times to the different configuration memories. A configuration memory located closer to the destination of a considered data message from a subscriber can then obtain reconfiguration commands earlier than a configuration memory which is located earlier in the path along which the data message has to run when it is transfered from the subscriber to a central switch. Thereby data for other subscribers can be destroyed, these data flowing through the FIFO-memories associated with the configuration memories. Corresponding errors can occur, when the message passes out from the central switch through several cascaded multiplexer units.

The published British patent application GB-A 2 225 917 relates to a packet switched network and to updating of data after adding or removal of subscribers. The requirement for synchronism is avoided and a synchronism is produced. Changing subscriber data is made without influencing the communication of other subscribers.

SUMMARY

It is an object of the invention to arrange that a data flow in an STM network from subscribers can be changed, for example that a data flow from a subscriber can be started or stopped, without influencing the traffic of other subscribers.

An STM network comprises multiplexer units and a switch, the multiplexer units corresponding to the multiplexers/demultiplexers described in the International patent application cited above. When changing the traffic configuration memories are to be changed, which are arranged in the multiplexer units and which control the reading and writing in intermediate memories of FIFO-type in the multiplexer units. Unsynchronized writing in the configuration memories is avoided by transmitting particular signals between the configuration memories, when suitable on special lines arranged for this purpose or otherwise by means of special control messages which are arranged to be always forwarded in a time slot having a predetermined location in each forwarded frame.

BRIEF DESCRIPTION OF THE DRAWINGS

The invention will now be described in greater detail by way of non-limiting embodiments with reference to the accompanying drawings, in which.

DETAILED DESCRIPTION

Figure 1:
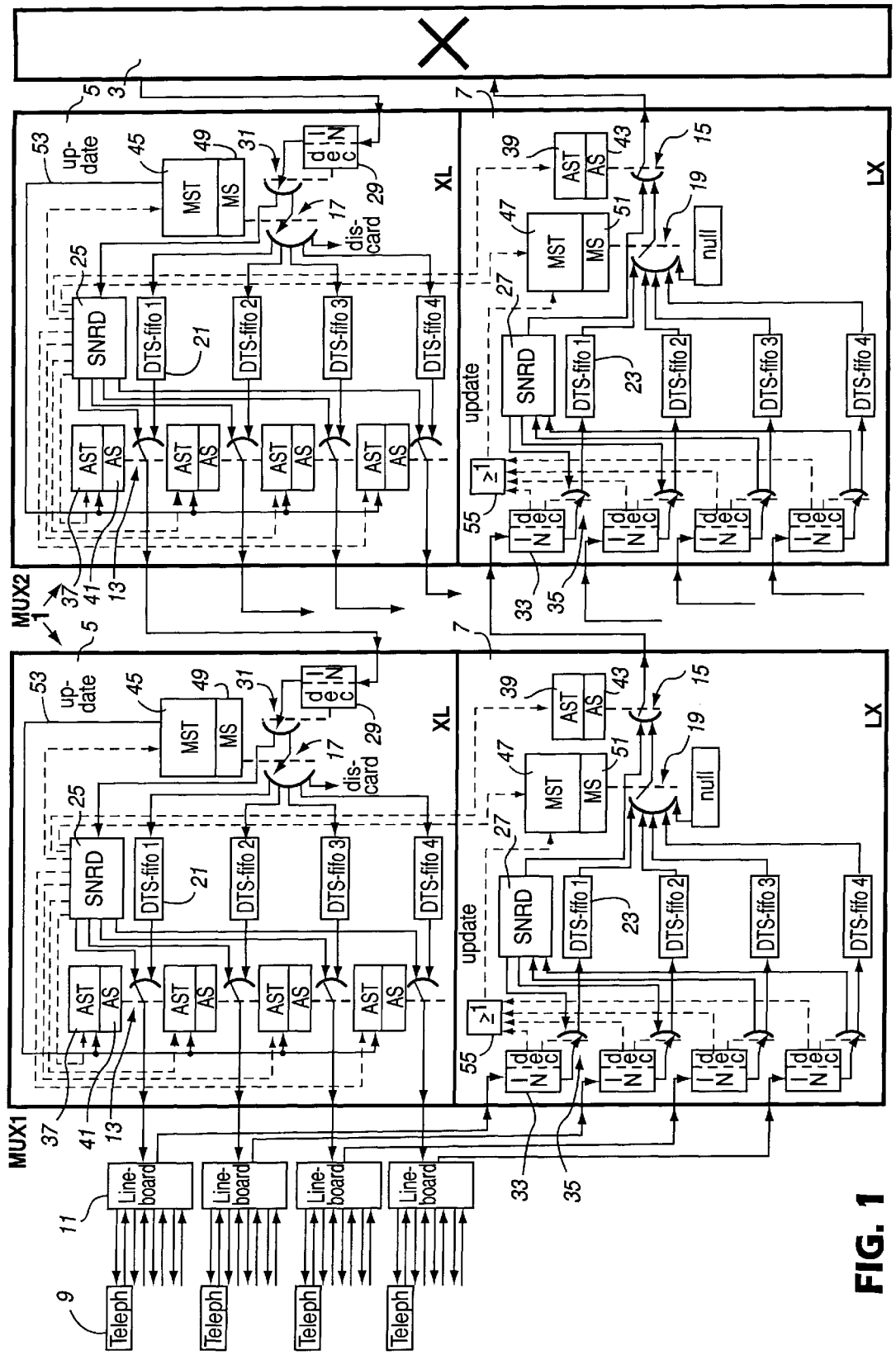
FIG. 1 is a block diagram of an STM network having two cascaded multiplexer units and one switch unit, in particular illustration the construction of the multiplexer units.

In FIG. 1 an STM network is schematically illustrated comprising two multiplexer units 1, also denoted by MUX1 and MUX2 respectively, MUX1 being connected close to the subscribers and MUX2 being directly connected to a central switch unit 3. The multiplexer units 1 are each divided in a first portion, a demultiplexer portion 5 for traffic in a direction towards the subscribers and from the switch 3, and a second portion, a multiplexer portion 7 for traffic inwards, in a direction towards the switch 3 and away from the subscribers, these portions or sides of the multiplexers also having the designations XL and LX respectively. The subscribers are illustrated as telephone sets 9, which through line boards 11 are connected both to outputs of the XL side or demultiplexer side 5 of the first multiplexer unit MUX1 and to inputs of the LX side or multiplexer side 7 of the first multiplexer unit MUX1. The line boards 11 handle the transfer of information from and to the telephone sets suitably in a time multiplexed or time divided manner. The line boards 11 also take care of the communication with the multiplexer unit 1, MUX1 directly connected thereto, and this communication is here supposed to be made in frames, which arrive or are transmitted at predetermined, regularly repeated times, for example like in common networks at times occurring with a period of 125 microseconds.

Figure 2:
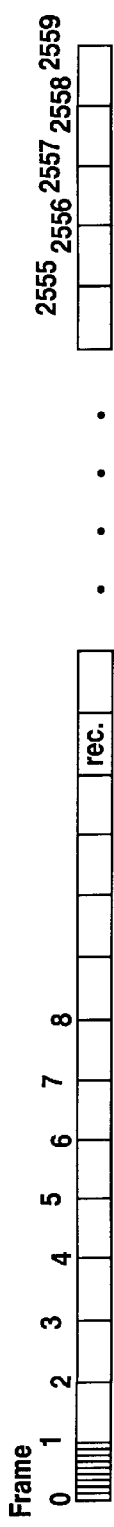
FIG. 2 shows a format of data frames forwarded in the network.

A typical format of such a frame is shown in FIG. 2. The frame contains a predetermined number of time slots, in the case illustrated 2560 time slots. Within each time slot a number of bits for different types of data are transmitted. Thus, in each time slot for example nine bits can be transferred, eight bits being the proper information content transmitted in this time slot, and one bit, the ninth bit, indicating the type of data which are transferred in the other eight bits of the time slot. These data can be useful data or useful information such as data generated by subscribers of different kinds or they can be control information needed for controlling the different units which are included in the network. Thus the ninth bit can be a zero in the case where the other eight bits are useful subscriber data, whereas in the case where this ninth bit is set to be equal to one, the contents in the other eight bits are control information which requires a different handling in the network. Such control information can in particular be processed by control circuits which take care that the communication operates in the intended way.

All communication of information between the line boards, the multiplexer units 1 and the switch 3 is thus supposed to be made in the shape of frames.

The sides 5 and 7 respectively of each multiplexer unit actually contain several different primary or proper multiplexers and demultiplexers, see the detailed block diagram of multiplexer units in FIG. 1. Thus in the demultiplexer portion 5, on the side closest to the subscriber, i. e. at the side which is directed towards the line boards 11, for each output primary multiplexers 13 are arranged, which can be switched between two different states depending on the fact whether a time slot included in a frame is a data time slot or a time slot for control information. The corresponding unit in the multiplexer portion 7 is a primary multiplexer 15, which is there connected directly before the output of this portion 7, in a direction towards the central switch 3. Furthermore, a central demultiplexer 17 is arranged at the switch side of the demultiplexer portion 5 and a central multiplexer 19 in the multiplexer portion 7, connected before the primary multiplexer 15, in a multiplexer unit 1, this central demultiplexer 17 and this central multiplexer 19 being arranged to be capable of selecting between several different lines, to which information is to be transmitted or from which information is to be received respectively. These lines are connected to memories 21 and 23 respectively (also denoted by "DTS-fifo"+No.) of FIFO-type. These FIFO-memories are arranged one for each connection at the subscriber side and one for each side 5, 7, in the example illustrated four FIFO-memories 21 and 23 respectively being arranged in each side 5, 7 of the multiplexer unit 1.

The control information arriving at a multiplexer unit 1 is transferred to central control units 25 and 27 respectively, also denoted by SNRD and SNRS respectively, in the demultiplexer portion 5 and the multiplexer portion 7 respectively. The control information can be removed or intermediately stored in these central control units in order to be possibly used by the control units, and further new control information can be added, which has its origin in the considered multiplexer unit 1, in particular in the respective central control unit 25, 27. For tapping control information on the subscriber side or XL-side 5 an input register 29 is arranged, thus on the subscriber side, which is of type shift register and in which all incoming data bits are first intermediately stored for a very short time. The input register 29 contains a decoding part, denoted by "dec", for-sensing whether each time slot contains data information or control information, i.e. for the format as described above whether the ninth bit is set or not. The decoder part provides a signal to a demultiplexer 31 having two outputs for guiding the incoming data flow either to the central demultiplexer 17 or the central control unit 25 of the subscriber side 5. The input of this demultiplexer 31 is thus connected to the incoming line, for example through the input register 29. In the same way, at each input line on the LX-side or switch side 7 an input register 33 comprising a decoder part, also denoted by "dec", is arranged, which first receives data transmitted in the time slots and holds them for a very short time. Each input register 33 controls a demultiplexer 35 of the same type as the demultiplexer 29 on the input side of the subscriber side having two outputs, one output of which is connected to the corresponding FIFO-memory 23 and the other output of which is connected to the central control unit 27 on this multiplexer side 7 of the multiplexer unit 1.

Figure 3:
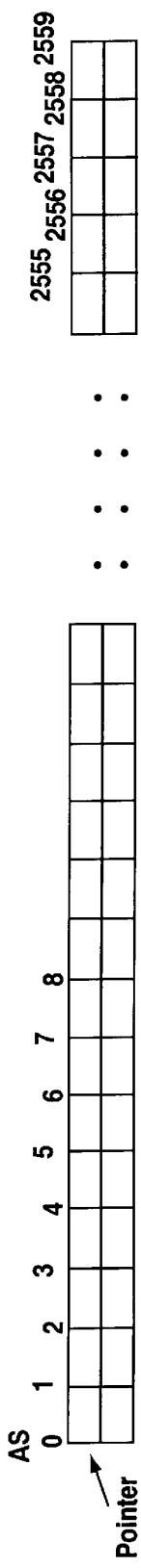
FIG. 3 shows the layout of a configuration memory on the subscriber side.

The above first mentioned primary multiplexers 13 and demultiplexers 15 respectively on the subscriber side 5 and the switch side 7 respectively in a multiplexer unit 1 are controlled by a secondary control unit 37, 39 respectively, also called AST (Allocation Store Setup), with which a respective configuration memory 41, 43 is associated, also called AS (Allocation Store). The layout of these configuration memories AS is illustrated in FIG. 3. For each time slot in a frame thus a binary unit is arranged in the configuration memory, which unit indicates whether the corresponding time slot is a time slot intended for useful subscriber information, such a time slot also being called DTS (Data Time Slot), or is a time slot intended for control information, such a time slot also being called CTS (Control Time is Slot). Like above a zero in a field in such a configuration register 41, 43 respectively can mean that the corresponding time slot is a data time slot whereas a binary one indicates that the corresponding time slot is a control time slot.

Figure 4A:
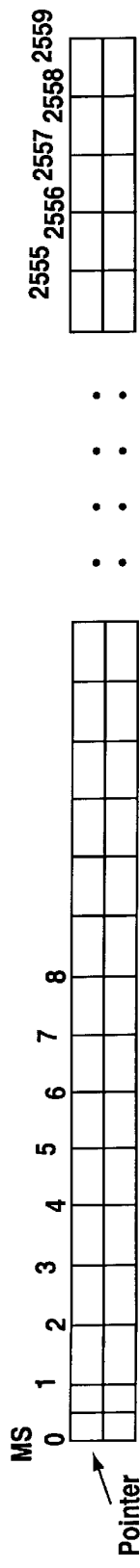
FIG. 4a shows the layout of a configuration memory on the switch side.

The central demultiplexer 17 in the demultiplexer portion 5 and the central multiplexer 19 in the multiplexer portion 7 respectively of the multiplexer units 1 are controlled by secondary control units 45 and 47 respectively, also called MST (Memory Store Terminal). With these secondary control units 45, 47 configuration memories 49, 51 respectively are associated, which are also called MS (Memory Store) and the layout of which is illustrated in FIG. 4a. A configuration memory MS thus comprises the same number of fields, for example 2560, which are included in each frame. In each field information is provided indicating the FIFO-memory 21, to which the information in the corresponding time slot is to be transferred, or from which FIFO-memory 23 data is to be fetched to the corresponding data time slot, respectively. For the illustrated embodiment having four outputs on the subscriber side and four inputs on the switch side of each multiplexer unit 1 thus two bits are required in each field in the configuration memories 49, 51 respectively, as illustrated in FIG. 4a.

The secondary control units 37 and 39 respectively and 45 and 47 respectively are controlled, for a reconfiguring operation, by signals from the central control unit 25 in the demultiplexer portion 5, i.e. in the subscriber portion 5 of the multiplexer 1. In the network all reconfiguring information must pass through the central switch or selector 3 and then return to the multiplexer 1 concerned, before it can be used therein. In the demultiplexer portion 5 of each multiplexer unit 1, in which transfer of information is made in a direction towards the subscribers from the switch 3, furthermore signal lines 53 are provided, by means of which information can be transferred directly from the secondary control unit 45, MST for the configuration memory 49, MS, connected on the input side of the subscriber portion 5 and controlling the central demultiplexer 17, to the secondary control units 37, AST for the configuration memories 33, AS controlling the output, primary demultiplexers 13.

The procedure in the network when forwarding information frames in a direction from the switch 3 towards the subscribers will now be described using the particular example given above. A data frame having the format illustrated in FIG. 2 thus arrives to the demultiplexer portion 5 in a multiplexer unit 1. A data frame is first received by the input register 29, in which the ninth bit in each individual time slot is decoded for determining whether the corresponding time slot contains data or control information. In accordance with the result of the decoding operation then the remaining eight bits are guided by the input demultiplexer 31, as controlled by a control signal thereto, either to the central demultiplexer 17 or directly to the primary control unit 25 in this side. The control unit 25 receives the control information, possibly processes it such as for providing commands for reconfiguring the configuration memories 41 and 49, 43 and 51 in the considered multiplexer unit.

Figure 4B:
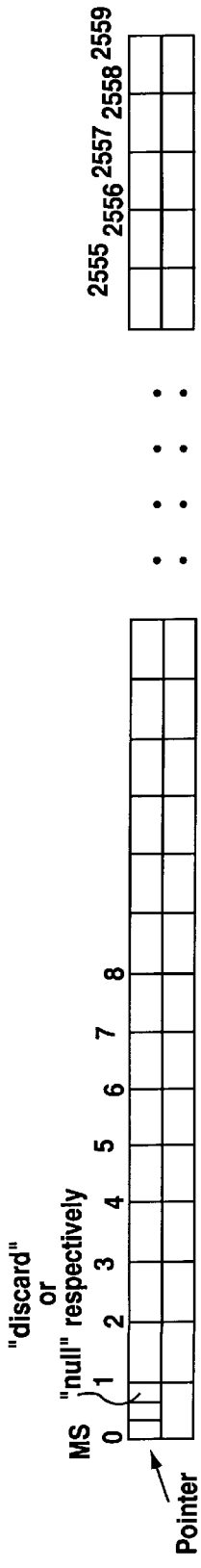
FIG. 4b shows an alternative layout of a configuration memory on the switch side.

The central demultiplexer 17 or the multiplexer for the FIFO-memories 21 in the demultiplexer portion 5 is controlled by its associated configuration memory 41, MS, which provides a suitable control signal, so that from the time slots indicated in the configuration memory 41 information is transmitted to correct different FIFO-memories 21. The demultiplexer 17 can also have an output, in the figure denoted "discard", to which information in a time slot is symbolically transmitted, when it is neither data information nor control information. However such an arrangement requires, that the configuration memory 49 is expanded by an extra bit for each time slot, which gives a total of three binary bits for each time slot, as is illustrated for the layout of a configuration memory in FIG. 4b. From the FIFO-memories 21 and from the control unit 25 then information is transmitted in the corresponding data time slots and control time slots by means of the output, primary multiplexers 13, which are controlled by their associated configuration memories 33, AS. The control unit 25 adds to control information prepared by itself and intended for a control time slot a ninth bit having the binary value "1", which indicates that the time slot contains control information. When transmitting stored useful information from one of the FIFO-memories 21 to a time slot, a ninth bit is added having the value zero and indicating that the time slot contains useful information. Possibly, instead this extra bit could be added in the primary multiplexers 13. A frame transmitted in this way from the multiplexer unit 1 is forwarded on the corresponding line in a direction towards the subscribers and is then processed in the same way by a possible, cascaded identical multiplexer unit 1, or by a line board 11. In such a cascaded multiplexer unit 1, such as MUX1 in FIG. 1, the same procedure is executed as has been described above, whereas in a line board 11 the information in a frame also in the corresponding way is divided into information associated with different connected subscribers 9 and control information required for the control of the line board 11 itself.

Now it is assumed, that a message is received by a central control unit 25, SNRD, that a reconfiguring is to be made for frames passing outwards from the switch 3 in a direction towards the subscribers, i.e. of the configuration memories 49, MS and 41, AS in the demultiplexer portions 5. A reconfiguring can for example consist of changing a time slot in an incoming frame in regard of its content, so that the content from now on is to be useful data information and the time slot thus will be a data time slot and in addition also information of the FIFO-memory 21 in the subscriber portion 5, to which the content in the new data time slot is to be transmitted. The control unit 25, SNRD then transmits the corresponding information both to the secondary control unit 45, MST for the configuration memory 49, MS for incoming frames and to the secondary control unit 37, AST for the configuration memories 41, AS for outgoing frames. The secondary control unit 37 for the configuration memory 41 for outgoing frames does not directly make a change of the contents of the configuration memory 41 but only prepares this change. The secondary control unit 37 then awaits a signal through the line 53 from the control unit 45 for the configuration memory 49 for incoming frames. This secondary control unit 45 on the input side then transmits a synchronization signal, as soon as it has made a change of the contents in its associated configuration memory 49. Possibly, this signal on the line 53 to the other control units 37 on the output side can be transmitted with some delay considering the time period required for the contents of a frame to pass through the subscriber portion 5 in a multiplexer unit 1.

As is illustrated in FIG. 4, the configuration memory 41, AS for outgoing frames on the demultiplexer side 5 can include space for more than one sequence of data indicating the configuration of outgoing, frames. The active data sequence is indicated by a pointer, which for example can be a value stored in a memory field. When new configuration data are entered, they are then stored in a memory position, which is not active. When later a command arrives, that a reconfiguring is to be made, only the pointer is changed and thereafter the whole reconfiguring operation is finished and the new, correct sequence in the configuration memory is to be used for the next outgoing frame. The same construction can also be arranged for the other configuration memories 43, AS, 49, MS, and 51, MS by arranging a pointer for each configuration memory, which is set by the associated control unit AST and MST respectively and which points to the configuring data valid at each time instant. Alternatively, the pointer can be replaced by a signal controlling selectors, one selector being arranged for each position in the sequences in the considered configuration memory.

The control units for the configuration memories are arranged to always make a change of their associated configuration memories at a predetermined time in relation to the transferred information, such as at the start of the next frame or generally after a predeter mined time pod after the next occurring boundary between frames.

If the contents in the configuration memories 49, 41 in the subscriber portion 5 would be changed simultaneously, for example at the next occurring boundary between frames, after a message thereof has been received by-the central control unit 25, SNRD and after the required processing therein this central control unit, the change of the configuration memory 41 on the output side could have been made, before the corresponding change was made on the input side in the configuration memory 49. It would result in a loss of data bits or that data bits could arrive at the wrong addressee.

The corresponding procedure, which has been described for a direction out from the switch 3, will now be described for the opposite direction, inwards towards the switch 3. An incoming frame arrives to a multiplexer unit 1 such as MUX1, which has a cascaded multiplexer unit MUX2 connected downstream in the considered data transmission direction. The frame arrives to an input register 33 in the multiplexer portion or switch side 7 and is there decoded substantially in the same way as in the input register 29 on the subscriber side 5, i.e. control bits, which indicate whether information is useful data or control data, are tapped off and are allowed to control a corresponding demultiplexer 35 having two outputs. On one of the outputs useful data are delivered in order to be intermediately stored in a corresponding FIFO-memory 23 and on the other output control data are guided to the primary control unit 27, SNRS in the multiplexer portion 7. The contents in the control time slots are possibly processed by the primary control unit 27 and are then generally, if required, forwarded in a direction inwards towards the central switch 3.

Useful data stored in the FIFO-memories 23 are provided to the different inputs of the central multiplexer 19, which is controlled by means of control signals generated as guided by the contents of the corresponding configuration register 51, MS in order to be entered in correct time slots in the forwarded frames. The control information is inserted by means of the multiplexer 15, which is controlled by control signals generated based on information in the associated configuration memory 43, AS. There in some suitable way, for example, when transmitting information for each time slot from a FIFO-memory 23 or from the primary control unit respectively, also the extra control information, i.e. the control bit or ninth bit, for each time slot indicating whether it is a data time slot or a control time slot is added. Alternatively this information can be entered in the output, primary multiplexer 15. The frame is then forwarded to the next multiplexer unit 1, MUX2. If a time slot is to neither contain useful information or control information, some suitable null pattern is to be entered in the time slot. It is illustrated symbolically by an input to the central multiplexer 19 from a register denoted "null". However, such an arrangement requires, that the corresponding configuration memory 51, MS is extended to comprise an extra bit for each time slot, i.e. at. least three bits are required in the embodiment using four FIFOs illustrated in the figures, see FIG. 4b.

Now it is again assumed, that a change is to be made in the configuration memories 51, MS and 43, AS, so that for example a data time slot associated with some FIFO-memory 23 in the LX portion 7 of the first multiplexer unit 1, here MUX1, is to be changed to instead contain control data from the central control unit 27 SNRS. The change within the multiplexer side 7 of the same multiplexer unit 1 is easily made without any risk for time errors but the corresponding change of the configuration memory 51, MS controlling the primary central multiplexer 19 in the multiplexer unit 1, MUX2, connected directly after the considered one, must also be changed and also the configuration memory 43, AS on the output side thereof, and then time errors can be produced. A line similar to the direct line 53 inside a multiplexer unit 1 as described above could then not be easily arranged, since it would extend between different multiplexer units 1. Geneally, the multiplexer units 1 are in the desired way to be connected to each other by means of a minimum number of standardized lines and no extra lines should be arranged. Thus the corresponding synchronizing and start signal must be produced in another way.

Thus, the primary or central control unit 25, SNRD in the XL-portion 5 in the first multiplexer unit MUX1 first receives information that a change of the configuration memories 51, MS and 43, AS in the LX-portion, i.e. in the switch side 7, is to be made and then transmits the corresponding information to the subordinate, secondary control units 47, MST and 39, AST for controlling the configuration memories 51, MS and 43, AS respectively. The control unit 25, SNRD in the next, second multiplexer unit, MUX2 also receives, on the corresponding input to this second multiplexer unit, i.e. on the input, on which data from the first multiplexer unit MUX1 is received, the same information and transmits information of the change to be made to its subordinate control units 47, MST and 39, AST, which handle the configuration of the configuration memories 51, MS and 43, AS. The secondary control units 47, MST and 39, AST prepare, for example in the same way as has been described above, the reconfiguring of their configuration memories 51, MS and 43, AS, but awaits a signal for making the definitive change. The control units 47, MST and 39, AST in the directly preceding multiplexer unit 1, MUX1 make, when receiving information that the reconfiguring is to be made, a change of the contents of their associated configuration memories 51, MS and 43, AS and the change is active directly after the change, suitably at the next boundary between frames transmitted from the first multiplexer unit MUX1.

At the same time as this, from the primary control unit 27 in a time slot arranged or determined especially for this purpose, such as for example the time slot denoted "rec." in FIG. 2, which is always fixedly arranged in frames transferred between the multiplexer units 1, the first and second multiplexer units MUX1 and MUX2, which are connected directly to or after each other, a signal that the reconfiguring is now to be made. The frame containing this information then arrives to the second multiplexer unit 1, MUX2, the specific information of the change is detected by it in the respective input register 33 thereof by means of its decoder part. Although, in FIG. 2 the predetermined, fixed time slot is illustrated as time slot No. 12, in can be advantageous to for example always use the first time slot, time slot No. 0, for carrying said signal. In the multiplexer units 1 there must always exist in the conventional way some frame start detecting means, not shown, and they can then easily give a signal to the decoder part of the input registers 33 that it now must be tested whether a reconfiguring signal exists in the first received time slot. From the decoder part in the input register 33 immediately a signal is transmitted to the corresponding control units 47, MST and 39, AST, the signal telling that now the previously commanded change of the configuration is actually to be made. Therefor lines are arranged from the decoder parts of all the input rib 33 to an OR-gate 55, the output of which is connected to the secondary, configuration control units 47, MST and 39, AST. Then, the secondary control units 47, MST and 39, AST make the previously prepared change, possibly including some calculated delay, at the next boundary between frames, which are transmitted trough the second multiplexer unit 1, MUX2. By arranging a fixed time slot thus having a predetermined order number among the time slots in the same the synchronizing or start signal for reconfiguring can be forwarded in the frame which is transmitted from the first multiplexer unit MUX1 to the second cascaded multiplexer unit MUX2, before the very reconfiguring has been made for the next frame. Thereby the reconfiguring can be made so that no data. bits arrive erroneously into a FIFO-memory 23 in the next connected multiplexer MUX2 or that otherwise errors in the transmission are produced.

What is claimed is:

1. A network for time divided communication of information in frames, each frame comprising a predetermined number of time slots, and information of only one kind selected among at least two different kinds of information transmitted in each time slot, and the network comprising a switch and a plurality of multiplexer units, each multiplexer unit comprising:

demultiplexers and multiplexers, and configuration memories associated with the demultiplexers and multiplexers, the configuration memories indicating the kind of information in each time slot, an individual control unit associated with each configuration memory, each of the multiplexer units arranged to receive information regarding changes of the configuration memories associated with the demultiplexers and multiplexers of the multiplexer unit and to transmit signals indicating the changes to the control units of the configuration memories associated with the demultiplexers and the multiplexers of the multiplexer unit, wherein each of the multiplexer units is arranged according to at least one of the following:

(i) for each of those of said signals which indicate changes of configuration memories affecting frames transmitted in a direction from the switch and passing through the multiplexer unit, each of the control units of the configuration memories associated with the multiplexers on an output side of the multiplexer unit being arrange to receive the signal indicating the change and when receiving the signal indicating the change prepare the indicated change of the configuration memory with which the control unit is associated, and the control unit of the configuration memory of the demultiplexer on an input side of the multiplexer unit being arranged to receive the signal indicating the change and then make the indicated change of the configuration memory with which the control unit is associated and, after the change has been made, transmit a signal indicating that the change has been made on a particular line to the control units of the configuration memories of the multiplexers on the output side, each of the control units of the multiplexers on the output side, when receiving on the particular line the signal indicating that the change has been made, making the change in the configuration memory with which the control unit is associated, which change has already been prepared, and (ii) for each of those of said signals which indicate changes of configuration memories affecting frames transmitted in a direction towards the switch from a first one of the multiplexer units to a second one of the multiplexer unit, the first and second ones of the multiplexer units connected after each other in a path of the frames transmitted in the direction towards a switch, the control unit of the configuration memory of the multiplexer on an output side of the first one of the multiplexer units being arranged to receive the signal indicating the change and then to make the indicated change of the configuration memory of the control unit, and to transmit, when the change has been made, a signal indicating that the change has been made in a fixedly arranged time slot in the next frame transmitted from the first one of the multiplexer units, and the control units of the configuration memories of the demultiplexers on an input side of the second one of the multiplexer units being arranged to receive the signal indicating the change of the configuration memories with which the control units are associated and, when receiving the signal indicating the change of configuration memories, prepare the change, and being arranged to then make this change, when the signal indicating that the change has been made is received in the fixedly arranged time slot in a frame passing through the second multiplexer unit towards the switch.

2. A multiplexer unit for connection in a network and having a multiplexer side and a demultiplexer side, data being transmitted between terminals of the network and the flow of data in the network organized, in a time divided way, in frames containing a predetermined number of time slots, information of at least a first kind forwarded in the time slots, so that information of at least the first kind is transmitted in the network from a first terminal through the multiplexer side of at least one multiplexer unit to a switch and further through the demultiplexer side of at least one multiplexer unit to a second terminal, the multiplexer unit comprising a central control unit, and the demultiplexer side of the multiplexer unit comprising at least two connections to lines on a subscriber side of the demultiplexer side, the subscriber side being directed towards the terminals, for transmitting in a direction towards the terminals, and a connection to a line on a switch side of the demultiplexer side, the switch side being directed towards the switch, for receiving frames from the switch, intermediate memories for temporarily storing in the demultiplexer side received information of the first kind, which is to be forwarded in a direction towards the terminals, a first configuration memory for indicating, for each time slot in a frame incoming to the demultiplexer side from the switch, the connection on the subscriber side, to which data transmitted in the time slot are to be forwarded from the demultiplexer side, second configuration memories, one of which arranged for each connection on the subscriber side for indicating those time slots in which information of the first kind is to be forwarded from the demultiplexer side, a first control unit for controlling the first configuration memory, second control units for controlling the second configuration memories, the second configuration memories arranged to prepare, after receiving a command from the central control unit, changes of the respective second configuration memories which they are arranged to control, the first control unit arranged to make, after receiving the command from the central control unit, a change of the first configuration memory, and to provide, after having made the change, a signal to the second control units, and the second control units arranged to immediately or after a predetermined time period after receiving the signal, make the already prepared changes of the respective second configuration memories which they are arranged to control.

3. A multiplexer unit for connection in a network and having a multiplexer side and a demultiplexer side, data being transmitted between terminals of the network and the flow of data in the network organized, in a time divided way, in frames containing a predetermined number of time slots, information of at least a first kind forwarded in the time slots, so that information of at least the first kind is transmitted in the network from a first terminal through the multiplexer side of at least one multiplexer unit to a switch and further through the demultiplexer side of at least one multiplexer unit to a second terminal, the multiplexer unit comprising a central control unit, and the multiplexer side of the multiplexer unit comprising at least two connections to lines on a subscriber side of the multiplexer side, the subscriber side being directed towards the terminals, for receiving from the terminals, and a connection to a line on a switch side of the multiplexer side, the switch side directed towards the switch, for transmitting towards the switch, intermediate memories for temporarily storing received information of the first kind to be forwarded towards the switch, a first configuration memory for indicating for each time slot, in which information of the first kind is to be transmitted, in a frame transmitted from the multiplexer side towards the switch, the connection on the subscriber side, from which information of the first kind is to be forwarded in the time slot, a second configuration memory for indicating those time slots, in which information of the first kind is to be forwarded from the multiplexer side, a first control unit for controlling the first configuration memory, a second control unit for controlling the second configuration memory, the first control unit arranged to prepare, after receiving a command from the central control unit, a change of the first configuration memory, the second control unit arranged to make, after receiving the command from the central control unit, a change of the second configuration memory, and to transmit, after having made the change, in a predetermined time slot not intended for information of the first kind, control information, a decoding unit arranged for each connection on the subscriber side to decode information in received time slots, each decoding unit arranged to transmit a signal to the first control unit after having received the control information in the predetermined time slot, and the first control unit arranged to make, after receiving the signal, immediately or after a predetermined time period, the already prepared changes of the first configuration memory.

* * * * *